US007232388B2

(12) United States Patent  
Sutherland et al.

(10) Patent No.: US 7,232,388 B2
(45) Date of Patent: Jun. 19, 2007

(54) POLYMER COMPOSITE BAT

(76) Inventors: Terrance W. Sutherland, 5390 Canotek Road Unit 20, Ottawa, Ontario (CA) K1J 1H8; Stephen Fitzgerald, 21 Torrington Dr., Halifax, Nova Scotia (CA) B3M 1YS; Frederick St. Laurent, 112 Rue de la Cascade, Val des Monts, Quebec (CA) J8N 1H9

( * ) Notice: Subject to any disclaimer, the term of this patent is extended or adjusted under 35 U.S.C. 154(b) by 0 days.

(21) Appl. No.: 11/399,917

(22) Filed: Apr. 6, 2006

(65) Prior Publication Data
US 2006/0247079 A1    Nov. 2, 2006

Related U.S. Application Data

(63) Continuation-in-part of application No. 10/825,902, filed on Apr. 16, 2004, now abandoned, which is a continuation-in-part of application No. 10/080,085, filed on Feb. 21, 2002, now Pat. No. 6,723,012.

(51) Int. Cl.
    *A63B 59/06* (2006.01)
(52) U.S. Cl. ..................................... 473/567
(58) Field of Classification Search ........ 473/564–568, 473/519, 520, 457
    See application file for complete search history.

(56) References Cited

U.S. PATENT DOCUMENTS

| 3,129,003 | A | 4/1964 | Mueller | 473/568 |
| 3,830,496 | A | 8/1974 | Reizer | 473/567 |
| 4,014,542 | A | 3/1977 | Tanikawa | 473/567 |
| 4,505,479 | A | 3/1985 | Souders | 473/566 |
| 4,569,521 | A | 2/1986 | Mueller | 473/520 |
| 4,848,745 | A | 7/1989 | Bohannan | 473/119 |
| 4,931,247 | A | 6/1990 | Yeh | 264/258 |
| 5,114,144 | A | 5/1992 | Baum | 473/567 |
| 5,301,940 | A | 4/1994 | Seki | 473/567 |
| 5,303,917 | A | 4/1994 | Uke | 473/567 |
| 5,364,095 | A | 11/1994 | Easton | 473/566 |
| 5,395,108 | A | 3/1995 | Souders | 473/567 |
| 5,407,195 | A | 4/1995 | Titola | 473/563 |
| 5,458,330 | A | 10/1995 | Baum | 473/567 |
| 6,139,451 | A | 10/2000 | Hillerich | 473/564 |

(Continued)

FOREIGN PATENT DOCUMENTS

| JP | 01148281 A | * | 6/1989 |
| JP | 406182010 A |   | 7/1994 |

*Primary Examiner*—Mark S. Graham
(74) *Attorney, Agent, or Firm*—Jeffrey S. Sokol; Cook & Franke S.C.

(57) ABSTRACT

A baseball bat is described having of an elongated cylindrical handle portion for gripping, a cylindrical barrel portion for striking and a tapered cylindrical mid-section connecting the handle portion and the barrel portion, wherein at least the barrel portion is tubular and is constructed solely of a polymer composite material with a three-dimensional fiber reinforcement architecture resulting in improved durability versus conventional polymer composite bats, without any sacrifice in playing performance. Also disclosed are polymer composite baseball bats where the polymer composite material includes between 85% and 100% fiberglass reinforcement fibers, and/or where the central cavity is filled with a damping material such as polymeric foam or a low-density granular material, and/or where the bats are constructed of multiple layers of intertwined tubular braid forms using a precision molding process.

6 Claims, 11 Drawing Sheets

U.S. PATENT DOCUMENTS

| | | | |
|---|---|---|---|
| 6,152,840 A | 11/2000 | Baum | 473/564 |
| 6,344,007 B1 | 2/2002 | Feeney | 473/567 |
| 6,352,485 B1 | 3/2002 | Philpot | 473/564 |
| 6,425,836 B1 | 7/2002 | Misono | 473/567 |
| 6,776,735 B1 | 8/2004 | Belanger | 473/567 |
| 2001/0046910 A1 | 11/2001 | Sutherland | |
| 2002/0198071 A1 | 12/2002 | Snow | 473/564 |
| 2003/0186763 A1* | 10/2003 | Eggiman et al. | 473/564 |
| 2004/0209716 A1 | 10/2004 | Vacek | 473/567 |

* cited by examiner

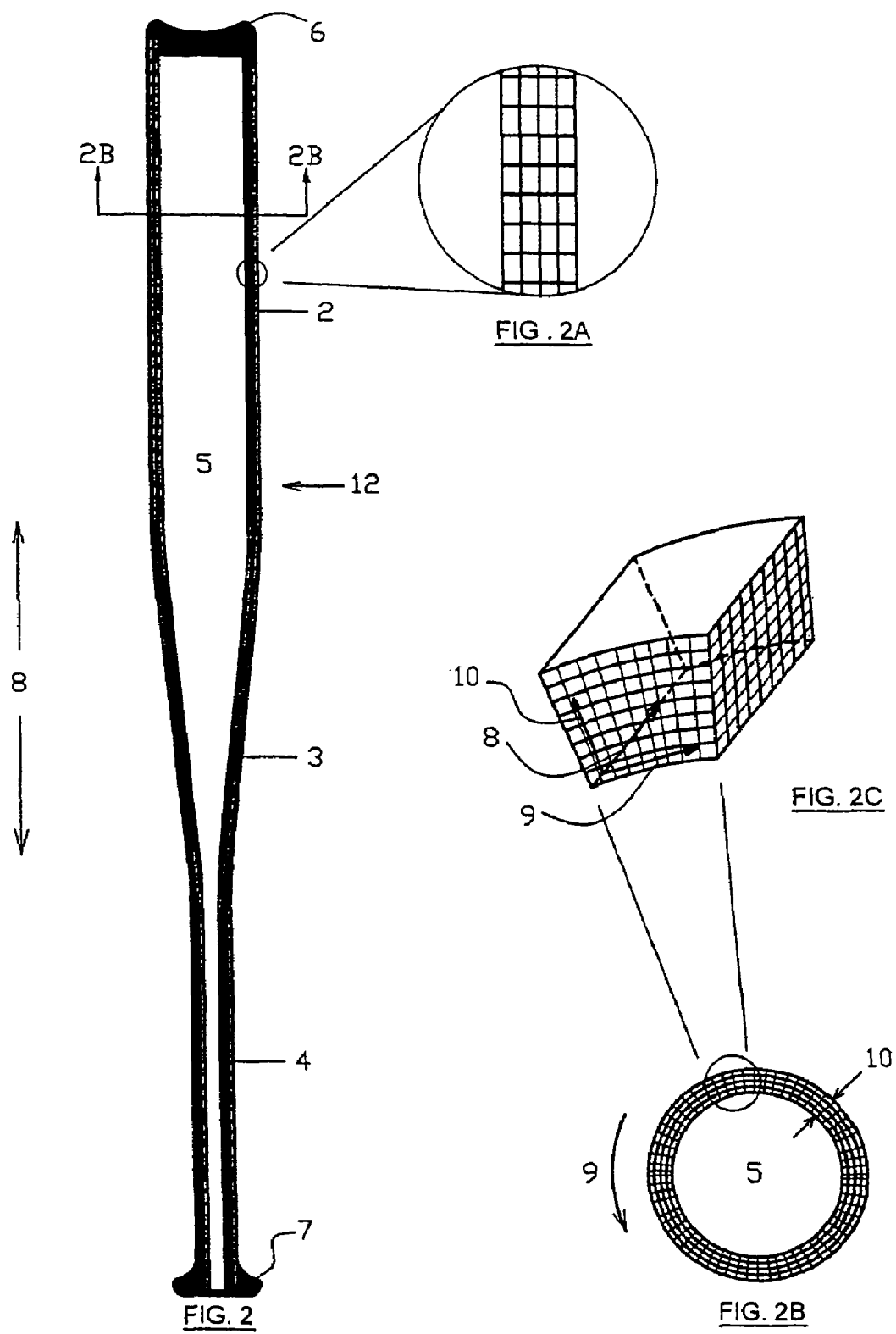

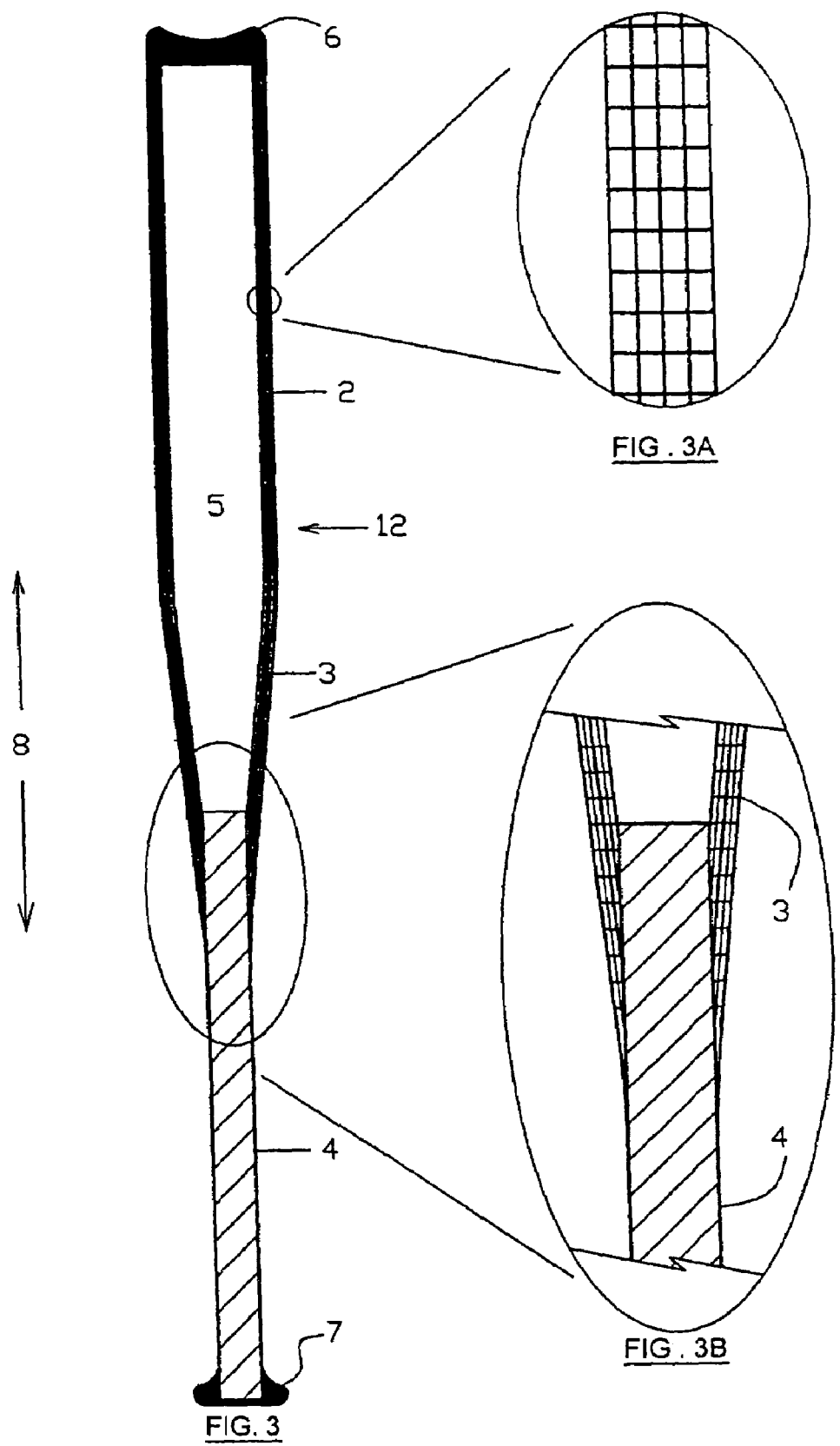

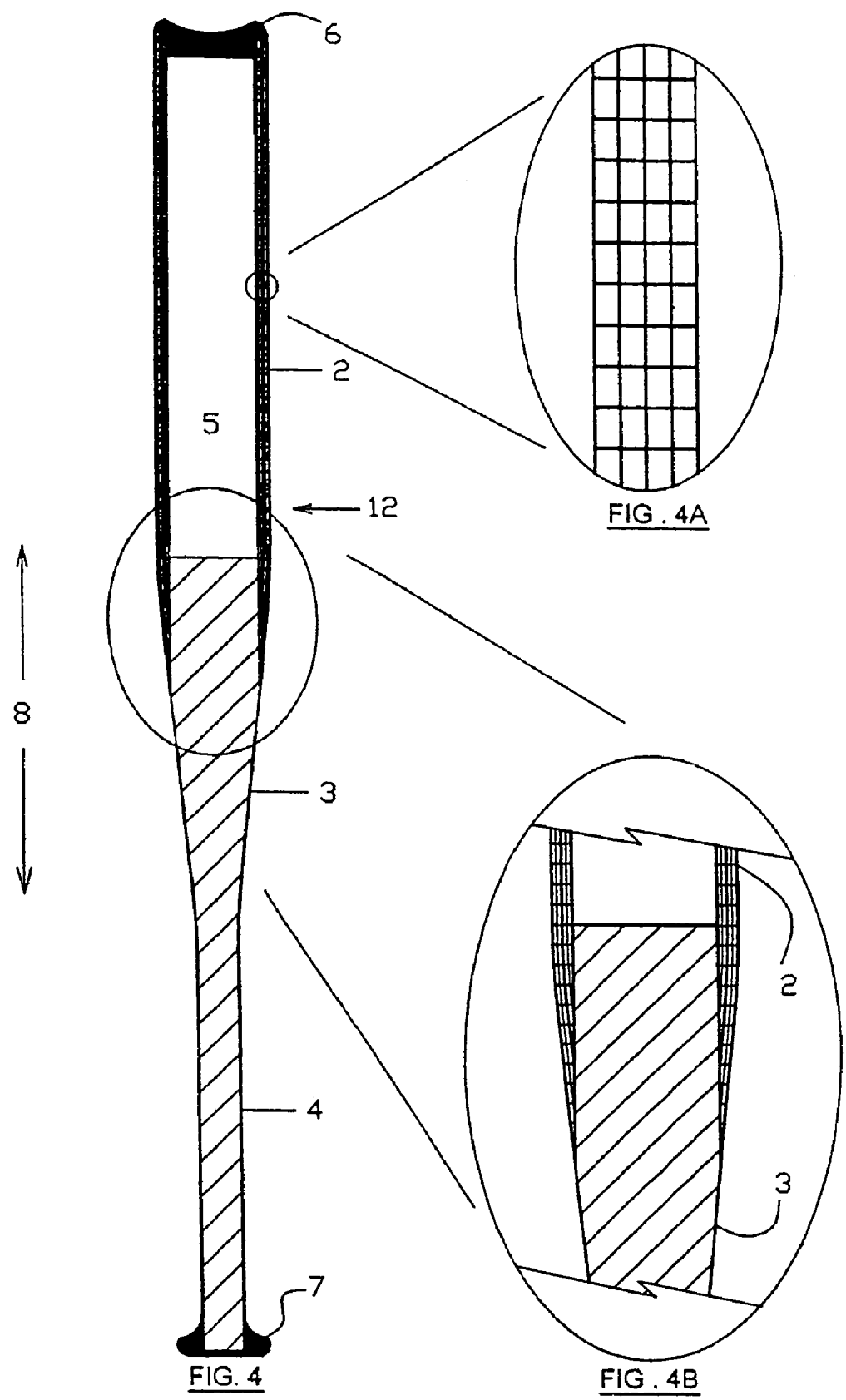

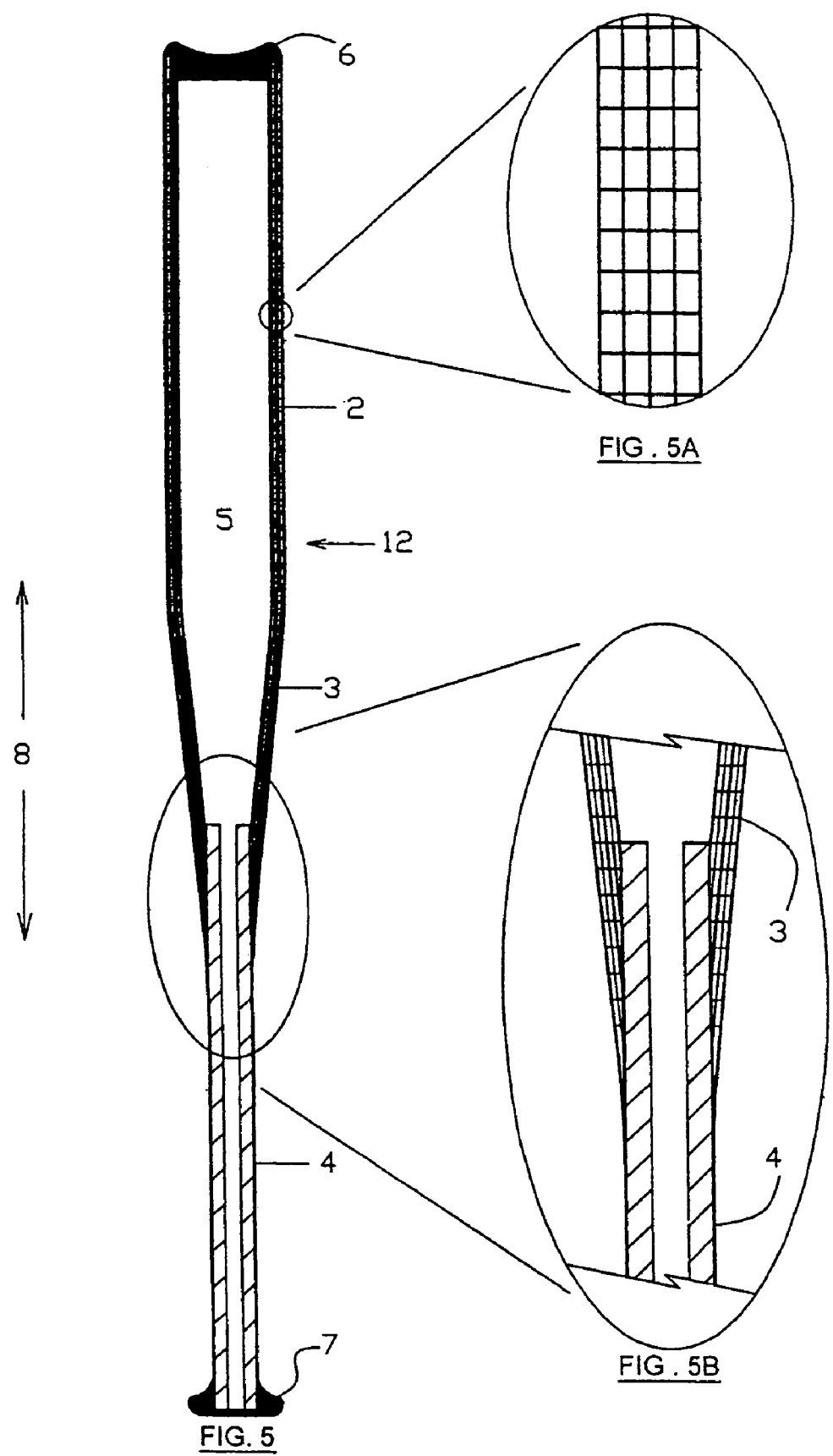

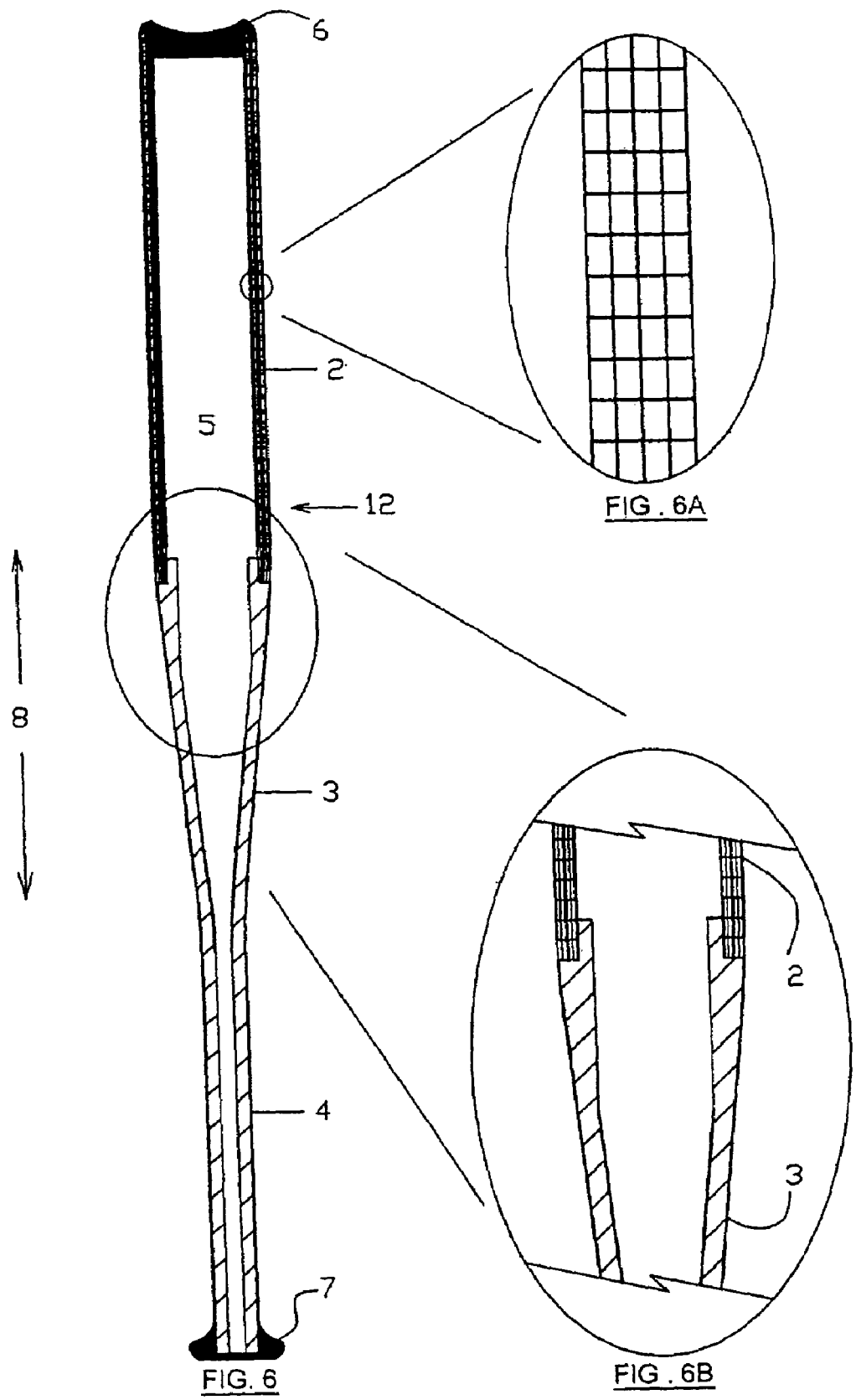

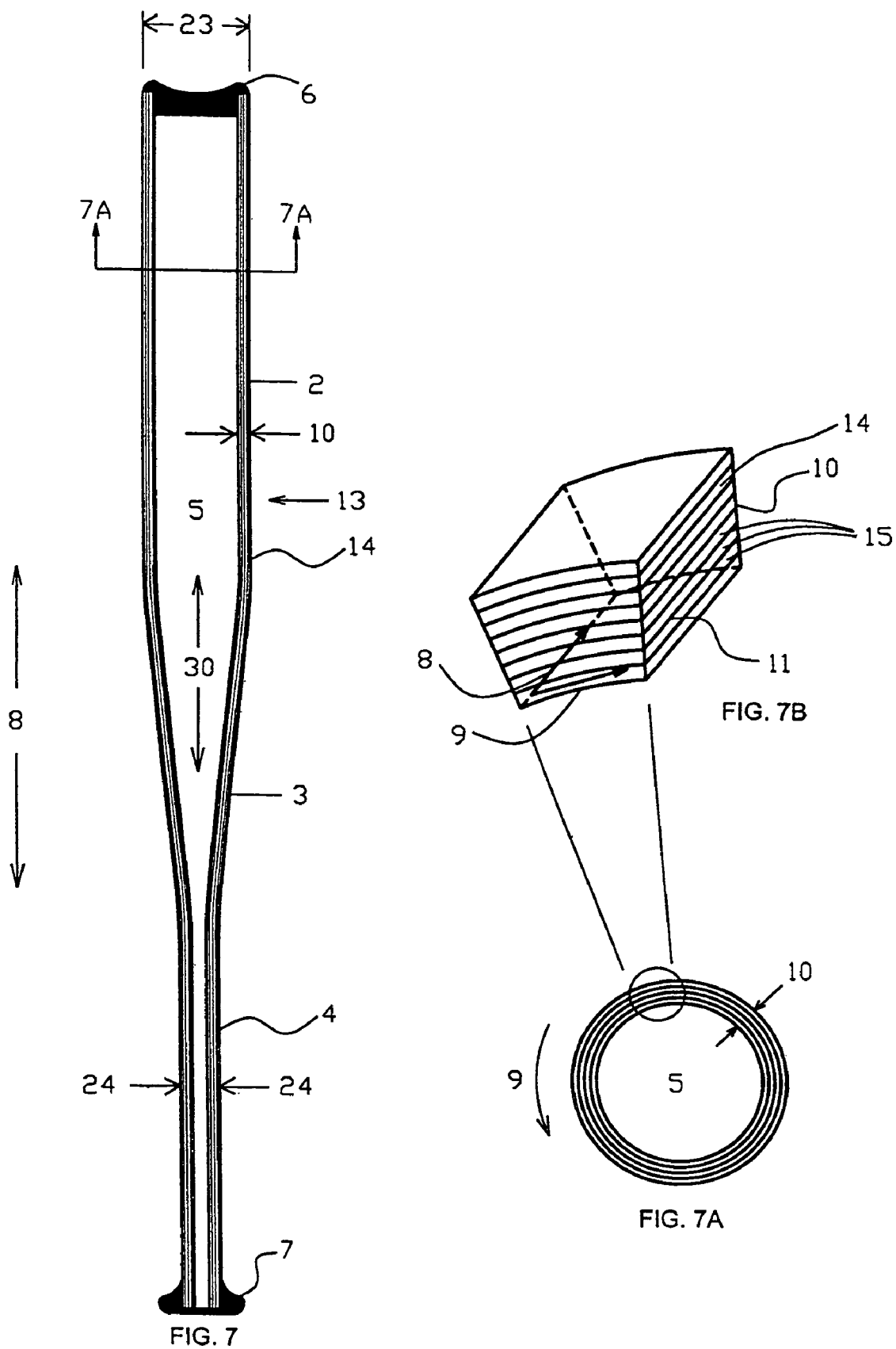

POLYMER COMPOSITE BAT

CROSS REFERENCE TO RELATED APPLICATION

This application is a Continuation-In-Part of U.S. patent application Ser. No. 10/825,902 filed April 16, 2004 now abandoned, which is a Continuation-In-Part of U.S. patent application Ser. No. 10/080,085 filed Feb. 21, 2002, now U.S. Pat. No. 6,723,012.

FIELD OF THE INVENTION

The present invention relates generally to baseball and softball bats and in particular to such bats wherein at least the striking portion is constructed solely of polymer composite materials having a fiber reinforcement architecture that provides the required durability for a baseball bat, which is subject to repeated ball impacts, while at the same time providing superior or equivalent performance when compared to existing all wood, all metal, all composite, or hybrid material baseball bats.

BACKGROUND

Since the inception of the game of baseball, almost a century ago, manufacturers of baseball bats have continually sought out new materials and designs to make bats both better performing; that is, easier to hit, and/or longer hitting; and more durable; that is, less prone to breakage.

Baseball bats were initially made of wood. Today, wood baseball bats are all made of heavy and strong hardwoods, primarily ash. The rule of thumb for baseball bats made of ash (or other similar hardwoods such as hickory or birch) is that the length in inches equals the weight in ounces. Thus, today's wood baseball bats limit bat speed, and are also prone to catastrophic breakage. Such catastrophic breakage could lead to injury of not only players but also to bystanders and is a real concern to authorities. Also, as wood bats lose moisture and dry out, they lose strength and breakage increases. Replacing broken wood baseball bats is a major cost over the course of a baseball season. For these reasons, today the use of wood baseball bats is restricted mainly to major professional baseball leagues.

More recently, beginning in the mid 1970's, aluminum baseball bats captured a large majority of the market share versus wood bats, even though they are more expensive and players complain about vibrations and the "pinging" sound when a baseball is hit. There are three reasons for the success of aluminum baseball bats: 1) they are lighter than wood bats, thus increasing bat speed and increasing hitting distance; 2) they are locally less stiff than wood bats providing a "trampoline" effect upon ball impact, thus increasing hitting distance; and 3) they are less prone to breakage than wood bats.

Most recently, in an attempt to further lower the weight of aluminum bats and increase the "trampoline" effect, thinner walled and multi-walled aluminum bats have been produced, however, problems have been encountered with balls leaving dents or depressions in the bat and also, bat breakage.

Recently as well, beginning in the late 1980's, hybrid material baseball bats have been produced, incorporating polymer composite materials with both wood and aluminum. The objective of these hybrid bats is to improve either bat performance and/or durability. Such hybrid material baseball bats are described in U.S. Pat. No. 5,364,095 to Easton, U.S. Pat. No. 4,569,521 to Mueller, U.S. Pat. No. 5,395,108 to Souders, and U.S. Published Application No. 20010046910 A1 of Sutherland, all of which disclose means to improve the performance and/or durability of aluminum baseball bats by combining composite-like materials with aluminum. U.S. Pat. No. 6,139,451 to Hillerich, discloses another class of hybrid material baseball bats, which combine traditional ash wood bats reinforced full length with a fiberglass composite material, while earlier U.S. Pat. No. 3,129,003 to Mueller discloses an ash bat reinforced in the handle portion, with a composite-like material.

U.S. Pat. No. 4,014,542 to Tanikawa discloses a five-component hybrid baseball bat having a softwood balsam core, a main member made of foam, a metal tube having apertures for bonding fixed to the barrel portion only of the main member, and an outer layer of glass fiber painted with a synthetic resin.

U.S. Pat. Nos. 5,114,144, 5,458,330, and 6,152,840 to Baum disclose a hybrid multi-component bat having between five and eleven layers. Baum's bat includes external layers of wood veneer over a plurality of resin impregnated fabric socks, which in turn surround inner cores of foam, wood or aluminum which may include cavities.

The foregoing references describe hybrid material baseball bat structures, but do not disclose bats wherein at least the striking portion is constructed solely of polymer composite materials.

U.S. Pat. No. 4,848,745 to Bohannan discloses a two-dimensional filament winding process, which could be used to make an all polymer composite baseball bat, using layers (typical of today's existing composite laminate architecture) of continuous fiber reinforcement in a thermoplastic resin matrix. Bohannan describes an outer composite shell comprised of layers of helical, longitudinal, and circumferential fiber rovings impregnated in a thermoplastic resin.

U.S. Pat. No. 5,301,940 to Seki discloses a method of manufacturing a bat using a resin injection technique, with the resin being reinforced with layers of fiber.

The above two references concern possible methods for making polymer composite bats without any discussion of the fiber reinforcement architecture to be employed.

U.S. Pat. No. 5,303,917 to Uke discloses a bat comprising two telescoping tubes, made of plastic or plastic with fiber reinforcement, that overlap in the region between handle and barrel.

U.S. Pat. No. 5,395,108 to Souders discloses a synthetic wood composite bat composed of a shell of layers (or plies) of fiber-reinforced resin, a dry fiber tube inside the shell, and a rigid foam filling the shell. Souders specifically describes the existing two-dimensional fiber reinforcement architecture comprising "a plurality of cured layers of fiber resin reinforced material." Such existing fiber reinforcement architecture, as described by Souders, is well known to perform poorly under impact loading situations, as repeatedly encountered by baseball bats. This poor performance is due to inter-laminar (that is, interlayer or inter-ply) failure between the laminates, layers, or plies of polymer composite material. Further, Souders describes an inner dry fiber tube, which is not a polymer composite material.

Moreover, polymer composite baseball bats are typically constructed using a mixture of fiber reinforcement materials such as fiberglass, graphite and aramid. Usually the mix ranges from 67% to 84% by volume of fiberglass combined with from 16% to 33% of other fibers. Generally, the reason for using a mixture of fibers is to achieve a suitable combination of weight, strength, and stiffness. The problem with such fiber reinforcement mixtures is that they tend to suffer from limited durability due to the presence of the stiffer and stronger graphite and aramid fibers, which are less durable under impact loads due to relatively low elongation under impact and relatively poor resin adhesion.

Further, all polymer composite bats of the prior art have been constructed by one of the processes commonly referred to as filament winding, tube rolling, bladder molding, compression molding, or hand lay up. All such prior art processes originated in the aerospace industry and, as such, have limitations when used to produce baseball bats at high volume and low cost.

None of the above references describe a polymer composite baseball bat wherein at least the striking portion is constructed solely of polymer composite materials having the laminate architectures or fiber reinforcement techniques required to yield a bat with the necessary combination of thickness (which affects stiffness) and durability, required to ensure the maximum "trampoline" effect, and thus good hitting performance, while at the same time being able to withstand repeated impacts without damage.

A polymer composite material consists of a non-homogenous combination of reinforcement fibers in a polymer resin matrix whereby the resultant polymer composite material has superior properties when compared to either the reinforcement fibers or the polymer resin matrix taken separately. The reinforcement fibers employed in a typical polymer composite material may be graphite (or carbon), aramid (or Kevlar"), fiberglass, or boron, or other suitable fibers, or combinations thereof The polymer resin may be any suitable resin, such as epoxy, vinyl ester, polyester, urethane, nylon, urethane, or other suitable resins, or mixtures thereof.

The following is a specific properties chart showing the density, stiffness and strength properties of various possible materials for use in making baseball bats. All data is taken from standard textbooks available in the field. Specific stiffness and specific strength are actual stiffness and strength divided by density respectively. Strengths for composite materials are given as tensile strength measured along fiber direction in a unidirectional part. Strength for wood is given as the minimum of tensile and compressive ultimate strength. Strength for metal is given as ultimate tensile strength. Unless otherwise indicated, the term "stiffness" as used in this application is equivalent to the modulus of elasticity and is a measure of the change in length of a material under loading. Stiffness or modulus is provided in pounds per square inch (usually Msi or Millions of pounds per square inch). For a tubular body, such as a baseball bat, stiffness of the material can be measured in the axial direction, parallel to the longitudinal axis of the tube or the radial or transverse direction, perpendicular to the longitudinal axis of the tube. Axial "bendina stiffness", on the other hand, is a measure of how bendable the tube is along the axial direction. Axial bending stiffness is calculated as a multiple of the axial stiffness or modulus of the material and the second moment of area of the tube and is provided in lbs-in$^2$. Radial "compression stiffness" is a measure of the force required to depress a section of the tube in the radial or transverse direction. Radial compression stiffness is a product of the radial stiffness or modulus of the material and the thickness and width of the tube, and is provided in pounds per inch.

| Materials | Density lbs/ft3 | Stiffness Msi | Specific Stiffness | Strength Ksi | Specific Strength |
|---|---|---|---|---|---|
| Steel AISI 304 | 487 | 30.00 | 3.90 | 85.00 | 10.90 |
| Aluminum 6061-T6 | 169 | 10.00 | 3.70 | 45.00 | 16.60 |
| Aluminum 7075-T6 | 169 | 10.00 | 3.70 | 83.00 | 30.50 |
| Titanium Ti-75A | 283 | 17.00 | 3.70 | 80.00 | 17.70 |
| High Modulus Graphite | 102 | 38.00 | 23.30 | 165.00 | 100.00 |
| Intermediate Modulus Graphite | 102 | 34.00 | 19.50 | 180.00 | 109.80 |
| Commercial Graphite | 98 | 21.00 | 13.30 | 210.00 | 132.90 |
| E-Glass | 130 | 7.00 | 3.10 | 135.00 | 64.30 |
| S-Glass | 124 | 8.00 | 4.00 | 155.00 | 77.60 |
| Kevlar 49 | 86 | 11.00 | 8.00 | 210.00 | 152.20 |
| White Ash | 42 | 2.00 | 3.00 | 8.00 | 12.10 |
| Bigtooth Aspen | 27 | 1.00 | 2.30 | 4.00 | 9.30 |
| Yellow Polar | 29 | 1.10 | 2.40 | 4.50 | 9.80 |

Polymer composites are over 16 times stronger than ash and 60% stronger than aluminum. However, they are over three times heavier than ash, while approximately 20% lighter than aluminum, the aluminum bats being hollow, therefore lighter than solid composite bats, on an equal volume basis. While a solid all polymer composite baseball bat would be much stronger than either a solid ash or aluminum bat, it would be much too heavy for regular use. However, a tubular all polymer composite bat could be made both stronger and stiffer than a similar tubular aluminum or titanium bat.

In summary, polymer composite materials can theoretically be employed to manufacture baseball bats, wherein at least the striking portion is tubular and made solely of a polymer composite material, which are both stronger and stiffer than today's predominantly all aluminum tubular baseball bats. However, the two dimensional layered fiber architecture used in current polymer composite materials performs poorly under impact loading conditions such as when baseball bats are impacted by baseballs. Thus, the limited attempts, to date, to commercially produce an all polymer composite baseball bat have largely been unsuccessful, primarily due to premature bat failure or breakage. To improve durability, the wall thickness of the polymer composite tube could be increased, however, increasing wall thickness dramatically increases radial compression stiffness and weight, which in turn lowers bat performance due a decreased "trampoline" effect as the thicker bat wall springs back less after impacting the ball.

What is needed then, is a baseball bat having at least a tubular striking portion made solely of a polymer composite material with a fiber reinforcement architecture, which can withstand repeated impacts with a baseball, thus providing the required durability, while at the same time having a wall thickness thin enough to ensure hitting performance that is at least equivalent to that of the best currently existing baseball bats.

Further, what is also needed, is a high precision, high volume, and low cost process for manufacturing all polymer composite bats, resulting in desirable, and differentiated, mechanical properties in the bat handle and barrel portions required for optimal bat performance.

SUMMARY

In view of the foregoing, there is a need for a polymer composite bat having at least the striking portion made solely of a polymer composite material, which is as durable, or more durable, than conventional baseball bats made of wood, aluminum, hybrid wood/composite, hybrid aluminum/composite, or multi-layer polymer composites.

There is also a need for a polymer composite bat having at least the striking portion made solely of a polymer composite material, which is of equivalent, or lower weight, than conventional baseball bats made of wood, aluminum, hybrid wood/composite, hybrid aluminum/composite, or multi-layer polymer composites.

There is a further need for a polymer composite bat having at least the striking portion made solely of a polymer composite material, with equivalent, or better, hitting performance as measured by hit distance, than baseball bats made of wood, aluminum, hybrid wood/composite, hybrid aluminum/composite, or multi-layer polymer composites.

There is yet another need for a polymer composite bat having at least the striking portion made solely of a polymer composite material, with a barrel length or hitting surface equivalent to, or longer than, conventional baseball bats made of wood, aluminum, hybrid wood/composite, hybrid aluminum/composite, or multi-layer polymer composites.

There is still another need for a polymer composite bat to provide having at least the striking portion made solely of a polymer composite material, and having a structure, which improves damping so as to minimize vibrations on the hands of the user.

There is another need for a process for manufacturing a polymer composite bat in high volumes, at reasonably low costs, and with high precision in order to achieve desired and differentiated mechanical properties in the bat handle and barrel portions required for optimal bat performance.

According to another aspect, there is provided a precision molding process to manufacture all polymer composite bats in high volumes, at reasonably low costs, and with high precision comprising the steps of: placing multiple layers of continuous length reinforcement fibers over a solid precision mandrel; placing the mandrel into a closeable external precision mold; closing and sealing the mold; heating the mold; injecting the mold with a thermoset resin, thereby combining the thermoset resin with the continuous length reinforcement fibers in a resin-fiber matrix; allowing the resin to cure, thereby forming a polymer composite material; extracting the mandrel and the polymer composite material from the mold; and extracting the mandrel from the polymer composite material.

According to another aspect, there is provided a baseball bat comprising: a handle portion for gripping, the handle portion having a handle length; a cylindrical tubular hollow void barrel portion for striking, the barrel portion having a barrel length; and a tapered mid-section portion connecting the handle portion and the barrel portion; the handle, barrel and mid-section portions constructed solely of a polymer composite material, the polymer composite material comprising a thermoset resin and continuous length reinforcement fibers, wherein the continuous length reinforcement fibers in the handle portion have a handle fiber length and the continuous length reinforcement fibers in the barrel portion have a barrel fiber length, and wherein the handle fiber length is greater than the handle length and the barrel fiber length is greater than the barrel length, the continuous length reinforcement fibers being arranged at a resultant fiber angle relative to a central longitudinal axis of the bat, wherein an average of the absolute values of all the resultant fiber angles in the handle portion is less than an average of the absolute values of all the resultant fiber angles in the barrel portion, thereby providing the handle portion with an axial stiffness that is greater than the axial stiffness of the barrel portion, and wherein the axial bending stiffness of the handle portion is between 50,000 lb-in$^2$ and 250,000 lb-in$^2$, and the radial compression stiffness of said barrel portion is between 70 lb/in and 350 lb/in.

According to a further aspect, there is provided a baseball bat comprising: a handle portion for gripping, the handle portion having a handle length; a cylindrical tubular hollow void barrel portion for striking, the barrel portion having a barrel length; and a tapered mid-section portion connecting the handle portion and the barrel portion; the handle, barrel and mid-section portions constructed solely of a polymer composite material, the polymer composite material comprising a thermoset resin and continuous length reinforcement fibers, wherein the continuous length reinforcement fibers in the handle portion have a handle fiber length and the continuous length reinforcement fibers in the barrel portion have a barrel fiber length, and wherein the handle fiber length is greater than the handle length and the barrel fiber length is greater than the barrel length, the continuous length reinforcement fibers being arranged at a resultant fiber angle relative to a central longitudinal axis of the bat, wherein an average of the absolute values of all the resultant fiber angles in the handle portion is less than an average of the absolute values of all the resultant fiber angles in the barrel portion, thereby providing the handle portion with an axial stiffness that is greater than the axial stiffness of the barrel portion, and wherein the first bending mode frequency of the handle portion is between 100 and 600 hertz, and the hoop frequency of the barrel portion is between 800 and 2000 hertz.

Advantageously, all polymer composite baseball bats made in accordance with the descriptions contained herein are equivalent or lower in weight and are as durable or more durable, than conventional baseball bats made of wood, aluminum, hybrid wood/composite, hybrid aluminum/composite, or multi-layer polymer composites. The applicant's polymer composite bats as described herein, provide equivalent or better, hitting performance as measured by hit distance, and permit the construction of bats having equivalent or longer barrel lengths or hitting surfaces than such conventional bats. Further, the applicant's polymer composite bats can be constructed with a structure, which improves damping so as to minimize vibrations on the hands of the user.

BRIEF DESCRIPTION OF THE DRAWINGS

The applicant's polymer composite baseball bats will be further understood from the following description with reference to the drawings in which:

FIG. 2 is a longitudinal cross-section of one embodiment of the applicant's polymer composite bat, having a tubular handle, a tubular tapered mid-section, and a tubular striking or barrel portion constructed solely of a polymer composite material.

FIG. 2A is an enlargement of a section of FIG. 2, showing the three-dimensional fiber reinforcement architecture of one embodiment of the applicant's polymer composite bat.

FIG. 2B is a horizontal cross-section of the barrel portion of the baseball bat shown in FIG. 2.

FIG. 2C is a three-dimensional enlargement of a section of FIG. 2B, showing the three-dimensional fiber reinforcement architecture employed in accordance with one embodiment of the applicant's polymer composite bat.

FIG. 3 is a longitudinal cross-section of a further embodiment of the applicant's polymer composite bat, having a solid handle portion.

FIG. 3A is an enlargement of a section of FIG. 3, showing the three-dimensional fiber reinforcement architecture in the barrel portion.

FIG. 3B is an enlargement of a section of FIG. 3, in the area where the solid handle joins the tapered tubular mid-section.

FIG. 4 is a longitudinal cross-section of a further embodiment of the applicant's polymer composite bat, having a solid handle portion and a solid tapered mid-section.

FIG. 4A is an enlargement of a section of FIG. 4, showing the three-dimensional fiber reinforcement architecture in the barrel portion.

FIG. 4B is an enlargement of a section of FIG. 4, in the area where the solid mid-section joins the tubular barrel portion.

FIG. 5 is a longitudinal cross-section of a further embodiment of the applicant's polymer composite bat, having a tubular handle made of a different material than the tapered mid-section and the barrel portion.

FIG. 5A is an enlargement of a section of FIG. 5, showing the threedimensional fiber reinforcement architecture in the barrel portion.

FIG. 5B is an enlargement of a section of FIG. 5, in the area where the handle joins the tapered mid-section.

FIG. 6 is a longitudinal cross-section of a further embodiment of the applicant's polymer composite bat, having a tubular handle portion and a tubular tapered mid-section made of different material than the barrel portion.

FIG. 6A is an enlargement of a section of FIG. 6, showing the three-dimensional fiber reinforcement architecture in the barrel portion.

FIG. 6B is an enlargement of a section of FIG. 6, in the area where the tubular mid-section joins the tubular barrel portion.

FIG. 7 is a longitudinal cross-section of a further embodiment of the applicant's polymer composite bat comprised of multiple intertwined two-dimensional tubular braid forms arranged in multiple layers.

FIG. 7A is a horizontal cross-section of the barrel portion of the baseball bat shown in FIG. 7.

FIG. 7B is a three dimensional enlargement of a section of FIG. 7A showing the multiple layers of intertwined tubular braid forms.

DETAILED DESCRIPTION

Figures 1, 1A, 1B, 1C:
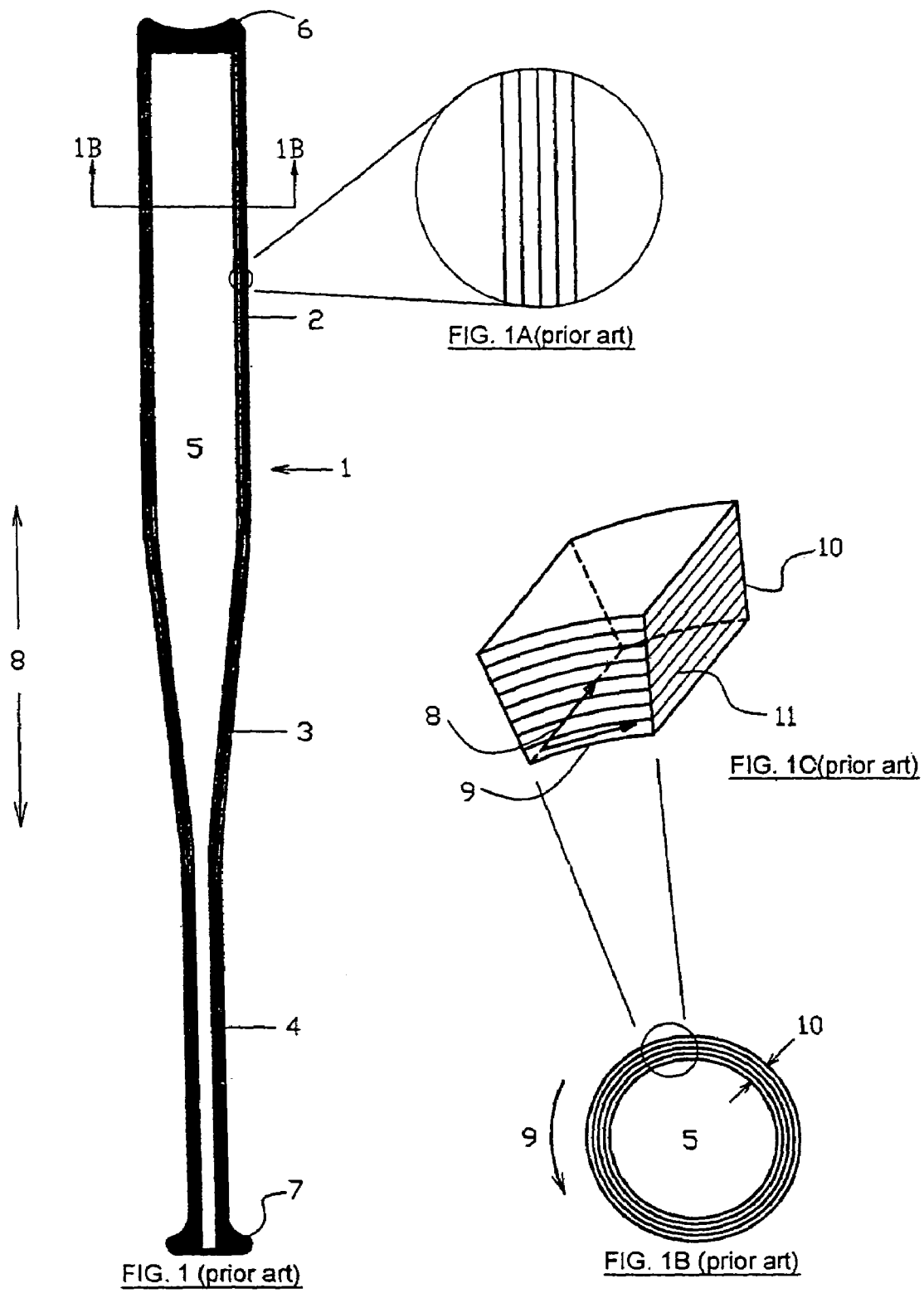
FIG. 1 is a longitudinal cross-section of a typical all polymer composite baseball bat of the prior art.
FIG. 1A is an enlargement of a section of FIG. 1 showing the typical two-dimensional multi-layer fiber reinforcement architecture employed in the prior art.
FIG. 1B is a horizontal cross-section of the typical multi-layer polymer composite baseball bat of the prior art shown in FIG. 1.
FIG. 1C is a three-dimensional enlargement of a section of FIG. 1B, showing the typical two-dimensional multi-layer fiber reinforcement architecture employed in the prior art.

FIG. 1, shows a tubular all polymer composite baseball bat typical of the prior art, having a bat body 1.

FIG. 2, illustrates one embodiment of the applicant's baseball bat, having a tubular bat body 12 constructed solely of a polymer composite material.

The bats shown in FIGS. 1 and 2, each have a handle portion 4 for gripping, a barrel or striking portion 2 for striking, impacting, or hitting, and a tapered mid-section 3, connecting handle portion 4 with barrel portion 2. A conventional endcap 6 and knob 7, constructed of any materials, are located at the ends of barrel 2 and handle 4, respectively. The interiors 5 of bat bodies 1 and 12 are hollow.

In one preferred embodiment, as discussed in further detail below, but not shown in the drawings, interior 5 could, alternatively, be filled partially or entirely with foam or a low-density granular material.

In further preferred embodiments, as shown in FIGS. 3, 4, 5, and 6, handle portion 4 and/or mid-section 3 can be solid or tubular and can be made from a polymer composite material, or from other materials such as wood, metal, aluminum, plastic, foam, composite, or other suitable materials.

FIG. 1A is an enlargement of a section of FIG. 1 showing the typical two-dimensional multi-layer fiber reinforcement architecture employed in the polymer composite materials of the prior art. FIG. 2A is an enlargement of a section of FIG. 2, showing the three-dimensional fiber reinforcement architecture of the polymer composite material of the applicant's polymer composite bat.

FIG. 1B is a cross-sectional view along lines 1B of FIG. 1, and FIG. 2B is a cross-sectional view along lines 2B of FIG. 2.

Bat bodies 1 and 12 have a length 8, a circumference 9, which varies in diameter along length 8, and a wall thickness 10, which may vary along length 8.

FIG. 1C is a three-dimensional enlargement of a section of FIG. 1B, showing the typical two-dimensional multi-layer fiber reinforcement architecture employed in the polymer composite materials of the prior art. FIG. 2C is a three-dimensional enlargement of a section of FIG. 2B, showing the three-dimensional fiber reinforcement architecture employed in accordance with the applicant's polymer composite bats as described herein.

The bats illustrated in FIGS. 1 to 6 are three-dimensional and have physical properties such as strength, stiffness and durability (toughness). These characteristics are important considerations in all three dimensions, along length 8, around circumference 9, and through thickness 10.

While a polymer composite baseball bat is three-dimensional, the reinforcement fibers, which largely determine the bat's physical properties, are supplied in their raw material form as continuous filaments or strands, which are grouped together and made available in a bundled form. These one-dimensional fiber bundles, known as yarns, tows, or rovings, have maximum physical properties along their length, and are placed along the length 8 or around circumference 9 of the bat. Commonly, reinforcement fibers are made into flat sheets, or broad goods, with the fibers arranged and held in two-dimensions by a knitting, braiding, or weaving processes. These two-dimensional reinforcement fibers are positioned in cylindrical planes covering both length 8 and circumference 9 of the bat. The length direction (0 degrees) is referred to as the warp direction while the width direction or circumference (90 degrees) is referred to as the weft direction. Fibers can be arranged all oriented in the warp direction at 0 degrees, all in the weft direction at 90 degrees, in both the warp and weft directions at 0 and 90 degrees, or at various angles to each other, such as +45 degrees and −45 degrees, etc. The typical tubular all polymer composite baseball bat, as shown in FIG. 1, and in particular in FIGS. 1A, 1B, and 1C, is made by layering one or two-dimensional reinforcement fibers to achieve the required thickness 10. Consequently, such polymer composite products are often called laminates.

Typically, ten to thirty individual layers or laminates, positioned in cylindrical planes defined by length 8 and circumference 9, are used for existing tubular all polymer composite bats. Since the fiber reinforcements within the layers have much higher physical properties (such as strength) than the polymer matrix, the baseball bat properties in cylindrical planes along length 8 and around circumference 9, are much greater than the physical properties through thickness 10. Thus, at a typical laminate boundary 11, as shown in FIG. 1C, between the layers, also known as the inter-laminar interface, the bat's physical properties are largely determined by the properties of the much weaker polymer resin matrix. For this reason, under impact loading, such as that which occurs in a bat-ball collision, bats having at least the striking portion 2 constructed solely of a polymer composite material, typically fail interlaminarly (that is, between the laminate layers), at a typical laminate boundary 11, and typically at much lower physical property (strength) levels than those of the fiber reinforcements. Consequently, the relatively few bat designs attempted to date, having at least the striking portion constructed solely of a polymer composite material, have not been commercially successful due to a lack of durability and premature failure resulting from the use of a two-dimensional fiber reinforcement architecture. In some cases, in an attempt to compensate for the lack of strength under impact loading, the wall thickness 10 of the bats has been increased. Such bats have suffered from poor performance due to increased weight and high radial compression stiffness resulting in little or no "trampoline" effect.

To solve these problems, the bat body 12 of one embodiment of the applicant's polymer composite bat, incorporates a three-dimensional fiber reinforcement architecture at least in the barrel or striking portion 2, which includes, in addition to fiber reinforcement placed on cylindrical planes defined by length 8, and circumference 9, fiber reinforcements that intersect the cylindrical planes of bat body 12, through thickness 10. The result is a bat 12, having at least the tubular barrel or striking portion 2 constructed solely of a polymer composite material, and having improved durability and increased hitting performance, due to its thinner-walled construction, and relatively low weight compared to similar conventional polymer composite bats using a two-dimensional fiber reinforcement architecture. The wall thickness 10 of bats made using this three-dimensional fiber reinforcement architecture, at least in the striking portion 2, is normally less than or equal to 0.25 inches. The resulting reduced weight of the applicant's polymer composite bat can be used to design longer barrel portions 2, having larger sweet spots.

As illustrated in FIG. 2, it is preferable that the entire bat body 12 be tubular and constructed solely of a polymer composite material using the three-dimensional fiber reinforcement architecture described above, however, the advantages of the applicant's polymer composite bats are also realized if only the barrel or striking portion 2 is tubular and constructed solely of a polymer composite material using the three-dimensional fiber reinforcements described herein. In this case, as shown in FIGS. 3 to 6, handle portion 4 and/or tapered mid-section 3 can be tubular or solid and can be made from polymer composite materials or other materials such as wood, metal, aluminum, plastic, foam, composite, or other suitable materials. For example, FIG. 3 shows bat body 12 having a solid handle portion 4 made of a different material than the remainder of the bat, FIG. 4 shows bat body 12 having a solid handle portion 4 and a solid tapered mid-section 3 made of different materials than barrel portion 2, FIG. 5 shows bat body 12 having a tubular handle portion 4 made of different material than the remainder of the bat, and FIG. 6 shows bat body 12 having a tubular handle portion 4 and a tubular tapered mid-section 3 made of different materials than barrel portion 2.

The use of a fiber reinforcement architecture that incorporates three-dimensional fiber forms at least in the tubular all polymer composite barrel portion 2 of bat body 12, significantly improves durability while maintaining, or improving performance. The applicant has utilized several types of three-dimensional fiber reinforcements in constructing the polymer composite bats described herein. These include random chopped strand mats, formed by chopping roving, yarn or tow into short lengths and pressing them together into thick layers with fibers randomly arranged in all directions, and continuous strand mat where the fibers are not chopped but instead are laid down by randomly swirling the fibers. Included as well, are three-dimensional fiber forms made by weaving, knitting, stitching, or braiding continuous fibers in a third vertical (thickness) direction. In making such three-dimensional broad goods, multiple layers of two-dimensional fabric, which are produced at the same time in parallel sheets, are simultaneously interlaced with fiber bundles or roving in the perpendicular or thickness direction. Because fiber bundles have maximum physical properties along the length of the fibers, the use of such three-dimensional broad goods and/or random chopped or continuous strand mats in the applicant's polymer composite bats, greatly reduces the typical weaknesses found at the inter-laminar boundaries 11, under impact loading, resulting in a much stronger and more durable all polymer composite tubular baseball bat 12 than was previously possible.

Advantageously, at least in the barrel portion 2, a single layer of three-dimensional fabric is used in a polymer resin matrix. This results in zero inter-laminar boundaries 11 and eliminates the problem of inter-laminar failure. A single layer of three-dimensional fiber reinforcement fabric provides the best combination of low weight, high strength, increased durability and reduced thickness. For a number of reasons, it may not be possible to use a single layer of three-dimensional fiber reinforcement. For example, the required wall thickness 10 may be greater than the thickness of available three-dimensional fabric. In these situations, multiple layers of three-dimensional fiber reinforcement can be used. However, because of the increased thickness of three-dimensional fiber forms, and their increased strength in the thickness direction compared with two-dimensional fiber materials, the number of layers required to achieve the same strength and durability is greatly reduced. The fewer number of layers and increased strength in the thickness direction greatly lessens the likelihood of inter-laminar failure and reduces the weight and thickness of the resulting bat.

To further reduce the likelihood of inter-laminar failure in a bat having multiple layers of three-dimensional fiber reinforcement, the applicant has found it advantageous to alternate the type of three-dimensional fiber from layer to layer. For example, a layer of three-dimensional random chopped or continuous strand mat can be used to separate layers of a three-dimensional broad good such as a woven fabric. The multi directional fibers of the random chopped or continuous strand mat reduces the likelihood of inter-laminar failure by interconnecting and binding together the two layers of woven fabric through the polymer resin matrix. Other combinations of knitted, woven, braided or stitched three-dimensional fibers offer similar advantages. Moreover, alternating layers of three-dimensional random chopped or continuous strand mat, with layers of two-dimensional reinforcement fibers will similarly reduce the likelihood of inter-laminar failure inherent in two-dimensional fiber reinforcement material.

Generally, the fiber reinforcement materials used in making the applicant's polymer composite bats as described herein are selected from a group consisting of fiberglass, graphite, aramid, and boron or other suitable fibers, or mixtures of any of these.

The polymer resin matrix used to bind the reinforcement fibers may be any suitable resin, such as epoxy, vinyl ester, polyester, urethane, nylon, urethane, or other suitable resins, or mixtures thereof. The polymer resin may be left to retain its natural color, or a color pigment may be added to the resin to result in bats of any desired color.

In addition to the above, the applicant has found that fiberglass has two important characteristics not present in other reinforcement fibers typically used to make baseball bats wherein at least the barrel portion 2 is tubular and made solely of a polymer composite material. These characteristics are significant in determining baseball bat toughness, impact resistance, and durability regardless of whether one- two- or three-dimensional fiber reinforcements are used. First, adhesion of the polymer matrix to the fiberglass fibers is significantly greater than the adhesion to other fiber candidates. Second, the elongation properties of fiberglass are far greater than those of other fibers, such as graphite, used in making existing all polymer composite bats. The greater elongation properties of fiberglass allow it to stretch without failure under impact loading. Thus, a bat having at least the barrel portion 2 made solely of a tubular polymer composite material composed of a higher percentage of fiberglass reinforcement fibers in a polymer resin matrix, results in a bat with increased durability relative to a similar bat having a lower percentage of fiberglass reinforcement fibers. The applicant has found that the greatest advantage from using fiberglass occurs when the percentage of fiberglass reinforcement fibers versus other fibers is between 85% and 100%. Ideally, having 100% fiberglass reinforcement fibers in a polymer matrix will have the greatest durability, toughness and impact resistance.

The ideal principle design objectives for baseball bats are high axial or longitudinal bending stiffness in the handle portion 4 to reduce bending mode vibrations resulting from ball impacts, which cause unfavourable feel or sting in the player's hands, high axial strength in the handle portion 4 to eliminate handle breakage, and low transverse stiffness in the barrel 2 to increase the trampoline effect and thus increase bat performance. Referring to FIGS. 7, 7A, 7B, and 7C, the applicant has determined that a baseball bat 13 made solely of a polymer composite material, comprising predominantly two-dimensional continuous length intertwined tubular braid fiber forms 14, combined in a thermoset resin matrix and arranged in multiple layers 15, is advantageous in being able to achieve all three of the above-stated design objectives, resulting in a durable, high performance baseball bat having a good feel and desirable and differential mechanical properties in the handle portion 4 and barrel portion 2. Such bats, though not as light weight as polymer composite bats made with three-dimensional fiber materials as described by the applicant herein above, have proved in both laboratory and field testing to be at least as durable as prior art aluminum bats. Further, intertwined tubular braid fiber forms 14 arranged in multiple layers 15 have been found by the applicant to be advantageous during bat construction, as they readily conform to a bat-shaped mandrel 40 (see FIG. 9A) used in the applicant's precision molding manufacturing process (as described below) and can extend full length 8 and/or partial length of the bat 13 to thereby produce different mechanical properties in the handle portion 4 compared to the barrel portion 2.

Two-dimensional intertwined tubular braid fiber forms 14 are produced from continuous length fiber tows 16 (see FIG. 7C), sometimes referred to as rovings or yarns. In each tubular braid fiber form 14, continuous length fiber tows 16 are interwoven such that a first set 17 is intertwined with a second set 18 in a continuous spiral pattern. Thus, such intertwined tubular braid forms 14 have fiber continuity from end to end of the form and the two sets 17, 18 of continuous length fiber tows 16 are mechanically interlocked or intertwined to each other. Because all the fiber tows 16 are continuous and mechanically locked or intertwined, tubular braid fiber form 14 has superior mechanical properties compared to other fiber forms. In particular, as required in baseball bats, tubular intertwined braid forms 14 have good impact resistance resulting from the mechanical intertwining of the two sets 17, 18 of fiber tows 16, and the natural nesting that occurs at the interlaminar interfaces 11 (see FIG. 7B) between adjacent layers of tubular braid forms 14, which further increases interlaminar strength over other two-dimensional fiber forms. This nesting effect is due to uniform hills 20 and valleys 21 (see FIG. 7C) formed by the intertwining of the two sets 17, 18 of fiber tows 16 across the surface of two-dimensional tubular braid form 14.

Tubular braid forms 14 are typically manufactured in a wide range of base tubular diameters, with one to four inches being the most common for use by the applicant in the manufacture of polymer composite bats described herein. The mechanical intertwining of the two sets 17, 18 of individual fiber tows 16 in two-dimensional tubular braid forms 14 results in the tows 16 being set at a fiber angle 22 relative to a central longitudinal axis 30 (see FIGS. 7 and 7C). When tubular braid form 14 is fixed at its base tubular diameter, the fiber angle 22 is referred to as the base fiber angle. For example, ±45° is the most common base fiber angle for intertwined tubular braid forms 14 used by the applicant. Tubular braid forms 14 of a given base tubular diameter can be expanded or contracted to conform to diameters that are somewhat greater than or somewhat less than the base tubular diameter. As tubular braid form 14 is expanded to conform to a larger diameter, the absolute value of fiber angle 22 increases (i.e. becomes greater than 45°). As tubular braid form 14 is contracted to conform to a smaller diameter, the absolute value of fiber angle 22 decreases (i.e. becomes less than 45°). The fiber angle 22 in the finished bat 13 is referred to as the resultant fiber angle. Since barrel portion 2 has an outside barrel diameter 23 that is larger than an outside handle diameter 24 of handle portion 4 (see FIG. 7), a single tubular braid form 14 extended over the full length 8 of bat 13 has different resultant fiber angles 22 in the handle portion 4 relative to the barrel portion 2. The ability of the applicant to produce bats having different resultant fiber angles 22 in the handle portion 4 compared to the barrel portion 2, is advantageous in achieving the above-described desirable and differentiated mechanical properties in the handle portion 4 relative to the barrel portion 2.

In a first example, tubular braid form 14 constructed solely of fiberglass tows 16, having base fiber angles 22 of ±45°, and base tubular diameter of two (2) inches, will have resultant fiber angles 22 of ±54° when expanded to stretch over barrel portion 2 having outside barrel diameter 23 of 2.25 inches, and resultant fiber angles 22 of ±19° when contracted to fit over handle portion 4 having outside handle diameter 24 of 0.9 inches.

As a second example, tubular braid form 14 constructed solely of fiberglass tows 16, having base fiber angles 22 of ±45°, and base tubular diameter of three (3) inches, will have resultant fiber angles 22 of ±32° when contracted to fit over barrel portion 2 having outside barrel diameter 23 of 2.25 inches, and resultant fiber angles 22 of ±12° when contracted to fit over handle portion 4 having outside handle diameter 24 of 0.9 inches.

Figure 7C:
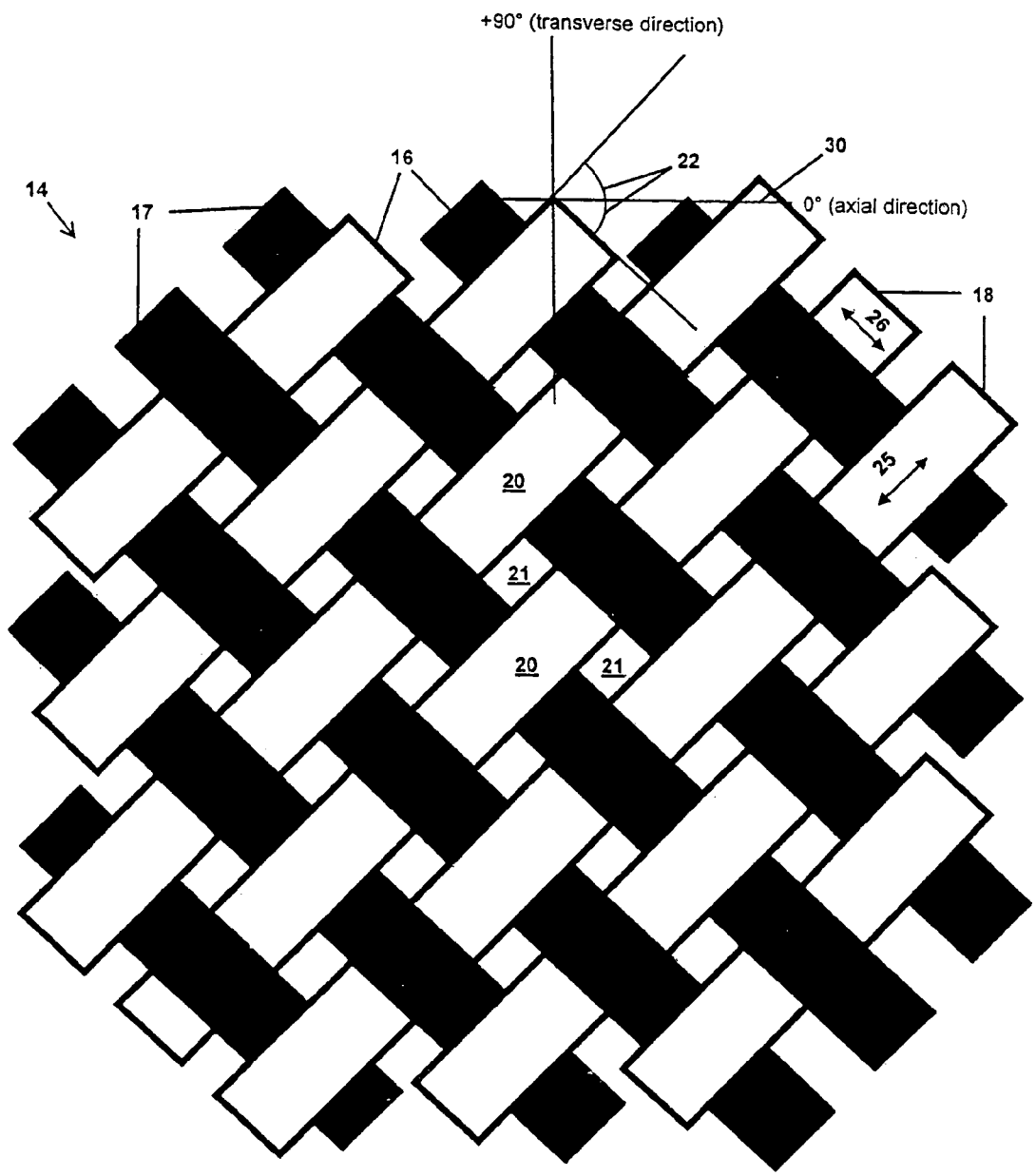
FIG. 7C is a magnified top view of a single layer of a typical intertwined tubular braid form used in the construction of the bat shown in FIG. 7.

Referring to FIG. 7C, due to the anisotropic nature of polymer composite structures, their stiffness and strength are significantly greater in a fiber length direction 25 parallel to the direction of fiber tows 16, as compared to a cross fiber direction 26 perpendicular to the direction of fiber tows 16. Thus, in the first example referred to above, for a two (2) inch tubular braid 14, axial stiffness (along the length 8, parallel to longitudinal axis 30) of barrel portion 2 is 22% less and axial strength is 37% less, than the same barrel made with the resultant fiber angles 22 of ±45°. Transverse stiffness (perpendicular to length 8 and longitudinal axis 30) of barrel portion 2 is 31% greater and transverse strength is 83% greater. Similarly, in handle 4, axial stiffness is 97% greater, axial strength is 519% greater, transverse stiffness is 44% less, and transverse strength is 60% less. Such resultant and differentiated mechanical properties between barrel portion 2 and handle portion 4 are particularly desirable to optimize both bat performance and feel.

In the second example referred to above, for tubular braid 14 have a base tubular diameter of three (3) inches, used on bat 13 having outside barrel diameter 23 of 2.25 inches and outside handle diameter 24 of 0.9 inches, axial stiffness of barrel portion 2 is 45% greater and axial strength is 136% greater, than the same barrel made with the resultant fiber angles 22 of ±45°. Transverse stiffness of barrel portion 2 is 29% less and transverse strength is 45% less. Similarly, in handle 4, axial stiffness is 116% greater, axial strength is 702% greater, transverse stiffness is 48% less, and transverse strength is 64% less.

The longitudinal or axial stiffness and strength of a standard all fiberglass polymer composite tube with all fiber angles 22 oriented at 0° to the longitudinal axis of that tube, is typically 8 Msi (million lbs/in$^2$) and 155 Ksi (thousand lbs/in$^2$), respectively. This compares to 2.4 Msi and 17 Ksi, respectively, for the same standard polymer composite tube having all fiber angles 22 oriented at ±45°. Thus, to achieve even higher axial strength and stiffness in handle portion 4, the applicant has found it useful to include in the handle portion 4 only, at least one layer of continuous length reinforcement fibers arranged in a stitched tubular form having all resultant fiber angles 22 of 0° relative to the central longitudinal axis 30 of bat 13. The tows 16 of stitched tubular forms are not braided or intertwined, but are merely stitched together in a tubular construction. This at least one layer of 0° stitched tubular fibers in the handle portion 4 does not affect the strength or stiffness of barrel portion 2, thus resulting in improved bat durability and feel without negatively affecting performance.

To further differentiate resultant stiffness and strength properties between handle portion 4 and barrel 2, the applicant has found it useful to include, within a selected single layer 15, one intertwined tubular braid form 14 that extends only the length of handle portion 4 or only the length of barrel portion 2 and a second intertwined tubular braid form 14 that extends the balance of the length 8 of bat 13. These two tubular braid forms 14, within the selected single layer 15, may have base tubular diameters and base fiber angles that are varied and differentiated as required to achieve the desired stiffness and strength differentials between handle portion 4 and barrel portion 2. Additional layers 15 of intertwined tubular braid forms 14 extending the full length 8 can be added either above or below the selected single layer 15. Multiple such selected single layers 15, each combining two differentiated tubular braid forms 14, may be included in the same bat 13.

The applicant's polymer composite bat 13 made predominantly of tubular braid forms 14, arranged in multiple layers 15, preferably has resultant fiber angles 22 in the handle portion 4 that range from 0° to ±45°, wherein an average of the absolute values of the resultant fiber angles 22 is less than 20° and generally in the range of 5° to 20°. In the barrel portion 2, the resultant fiber angles 22 range from ±20° to ±60°, wherein an average of the absolute values of the resultant fiber angles 22 is greater than 25° and generally in the range of between 25° to 35°. Thus, the average of the absolute values of the resultant fiber angles 22 for all layers 15 in the handle portion 4 is preferably between 5° and 30° less than the average of the absolute values of the resultant fiber angles 22 for all layers 15 in the barrel portion 2.

Further, as demonstrated in laboratory testing (i.e. frequency and model analysis), handle portion 4 of bat 13 has an axial bending stiffness of between 50,000 and 250,000 lb-in$^2$ and a first bending mode frequency of between 100 and 600 hertz. Barrel 2 of bat 13 has a transverse or radial compression stiffness of between 70 and 350 ib/in, and a first hoop mode frequency of between 800 to 2000 hertz, which both directly relate to the differential stiffness achieved in the handle 4 versus barrel 2 of bat 13.

Further, the nesting which results between each of the multiple layers 15 of intertwined tubular braid forms 14, due to the unique hills 20 and valleys 21 on the surface thereof, plus the mechanical intertwining of the tows 16, contribute to a significant increase in the durability of the applicant's polymer composite baseball bats made therewith.

Since intertwined tubular braid forms 14 are constructed of tows 16 that follow a spiral path around the circumference of tubular braid form 14, the fiber length of tows 16 is always greater than the braid form length of the corresponding tubular braid form 14. Accordingly, the length of fiber tows 16 in the handle portion 4 of bat 13 is always greater than the length of the handle portion 4, and the length of the fiber tows 16 in the barrel portion 2 of bat 13 is always greater than the length of the barrel portion 2.

The force produced in a ball-bat collision in a typical game of adult baseball can approach 10,000 lbs. Extensive testing conducted by the applicant has determined that to consistently and continually withstand these high ball/bat collision forces, the wall thickness 10 of barrel portion 2 of bat 13, as described herein by the applicant, is preferably in the range of 0.2 inches or less. Of course, if less strength and durability is required, for example for bats used in youth baseball or slow pitch, a thinner bat can be produced.

Due to the limitations imposed by commercially available raw material rovings or tows 16, intertwined tubular braid forms 14 are generally only available in thicknesses varying from 0.015 inches to 0.050 inches. Thus, a minimum of four layers 15 are required to achieve a resultant barrel wall thickness 10 of 0.2 inches. Of course, more layers could be necessary if thinner braid forms are used, and fewer layers may be required to make a thinner bat barrel, if desired.

Polymer composite materials are known to have superior damping properties relative to metals. Thus, bats of the applicant's polymer composite bats vibrate less and result in less stinging of the user's hands.

Further, as shown in FIGS. 2 to 6, tubular sections of the applicant's polymer composite bats have an internal cavity 5, that can be filled with a suitable damping material, such as a polymeric foam or low-density granular materials, or other suitable materials, in at least barrel portion 2, but also in tapered mid-section 3, or handle portion 4, or combinations thereof. Filling cavity 5, or parts thereof, with foam can be used to selectively weight the bat, and/or produce a differentiated more pleasing sound relative to the metallic pinging of an aluminum bat, and/or reduce vibrations providing less sting in the user's hands, and/or lower the trampoline effect, or hitting performance, if required by regulations. As shown in FIGS. 3 and 4, handle portion 4 and/or tapered mid-section 3 may be solid so that only the internal cavity 5 of barrel portion 2 is filled with damping material.

Moreover, filling cavity 5, or parts thereof, with a damping material such as polymeric foam or the like, creates a "structural sandwich" comprised of a thin, high strength, high stiffness external polymer composite sleeve or skin covering and bonded to a relatively thick, relatively weak lightweight foam core. The combination provides lightweight bats with high strength and stiffness and improved durability. In the case of the "structural sandwich" construction, the external all polymer composite sleeve or skin is constructed around the foam core, ensuring bonding of the polymer skin to the foam core. In the alternative, the foam core can be coated with resin and inserted into the previously constructed all polymer composite tube.

The types of polymeric foam used to fill cavity 5 include polystyrene, polyurethane, polyvinyl, polymethacrylimide, polyamide, syntactic, styreneacrylonitrile, polyolefm, or other similar foams, or combinations thereof. Typical foam densities range from approximately 3 lbs/ft$^3$ to 20 lbs/ft$^3$.

The applicant's polymer composite bats as described herein can be lower in weight than wood, metal, or hybrid metal bats. Lower weight results in faster bat speed, which in turn increases performance (hitting distance) and also allows a player more time before reacting to a pitched ball. A three-mile per hour (mph) increase in bat speed results in approximately 10 feet of additional hitting distance. Also, the increase in bat speed allows a player 3% more reaction time. This equals approximately 2 feet more of pitch length before the decision to swing or not must be made. The result is a further increase in performance, resulting in a better hitting average. Where the minimum weight of a bat is regulated, the lower weight properties of the applicant's all polymer composite bats can be used to lengthen the hitting area, that is barrel portion 2, and thus increasing the sweet spot, relative to conventional bats. This allows increased opportunity for the player to optimally contact the ball, which further increases performance and hitting average.

Also, lower weight polymer composite bats as described herein, can have secondary weights added evenly to both ends (balanced load) or at either end (end loaded), which can further improve performance and hitting distance.

Polymer composite bats as described herein by the applicant, may be manufactured by a variety of polymer composite processes including resin transfer molding, compression molding, hand lay-up, filament winding, and other processes known within the industry. The hollow tubular all polymer composite portions of the applicant's polymer composite bats are typically formed around a solid mandrel or tool, which is subsequently withdrawn, extracted, or dissolved. In the embodiment where cavity 5 includes a damping material such as polymeric foam, to form a "structural sandwich", the foam core may serve as the mandrel and remain as part of the finished bat.

Figure 8:
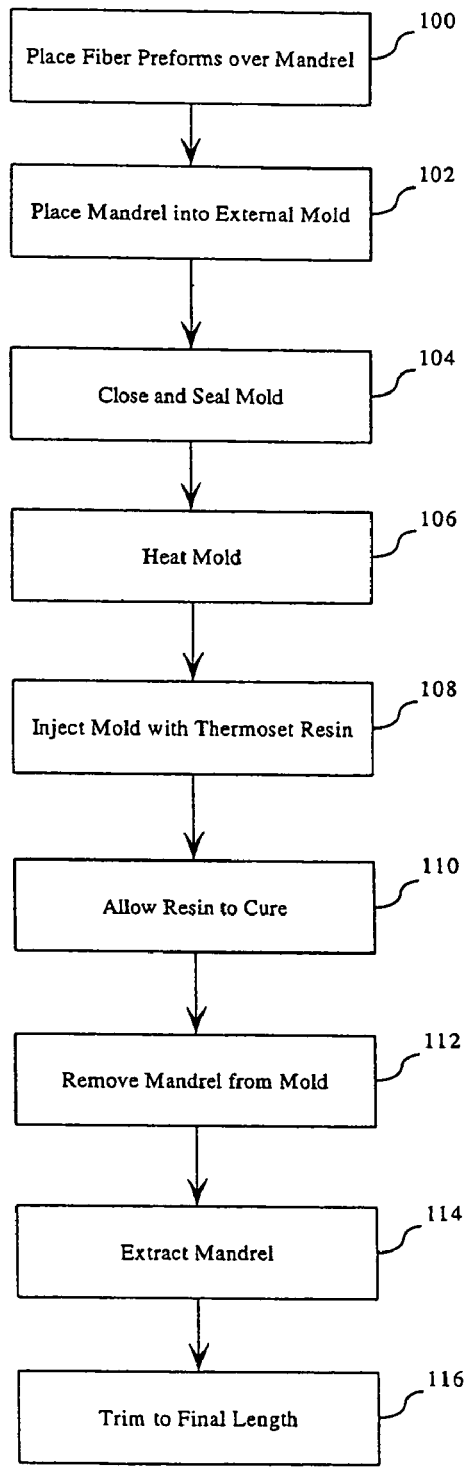
FIG. 8 is a block diagram showing the steps in the applicant's precision molding process for manufacturing polymer composite bats.
Figure 9A:
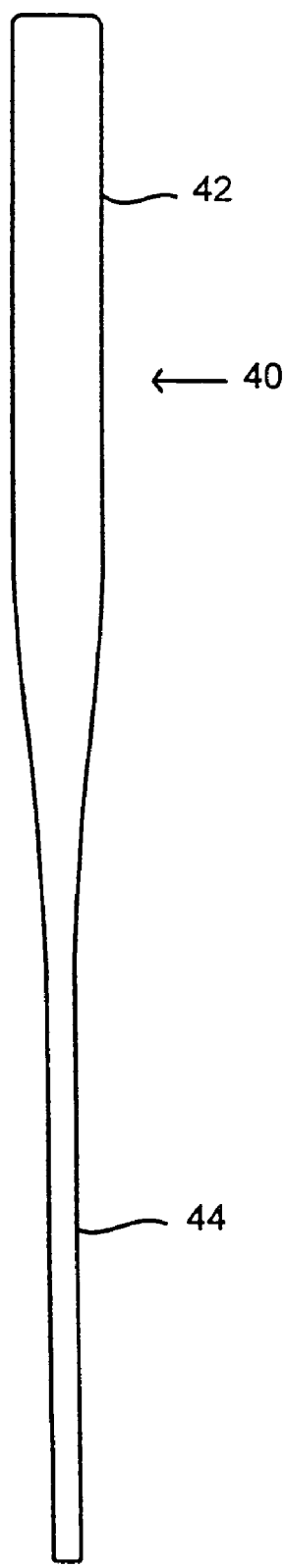
FIG. 9A is a top plan view of a precision mandrel used in the applicant's precision molding process.
Figure 9B:
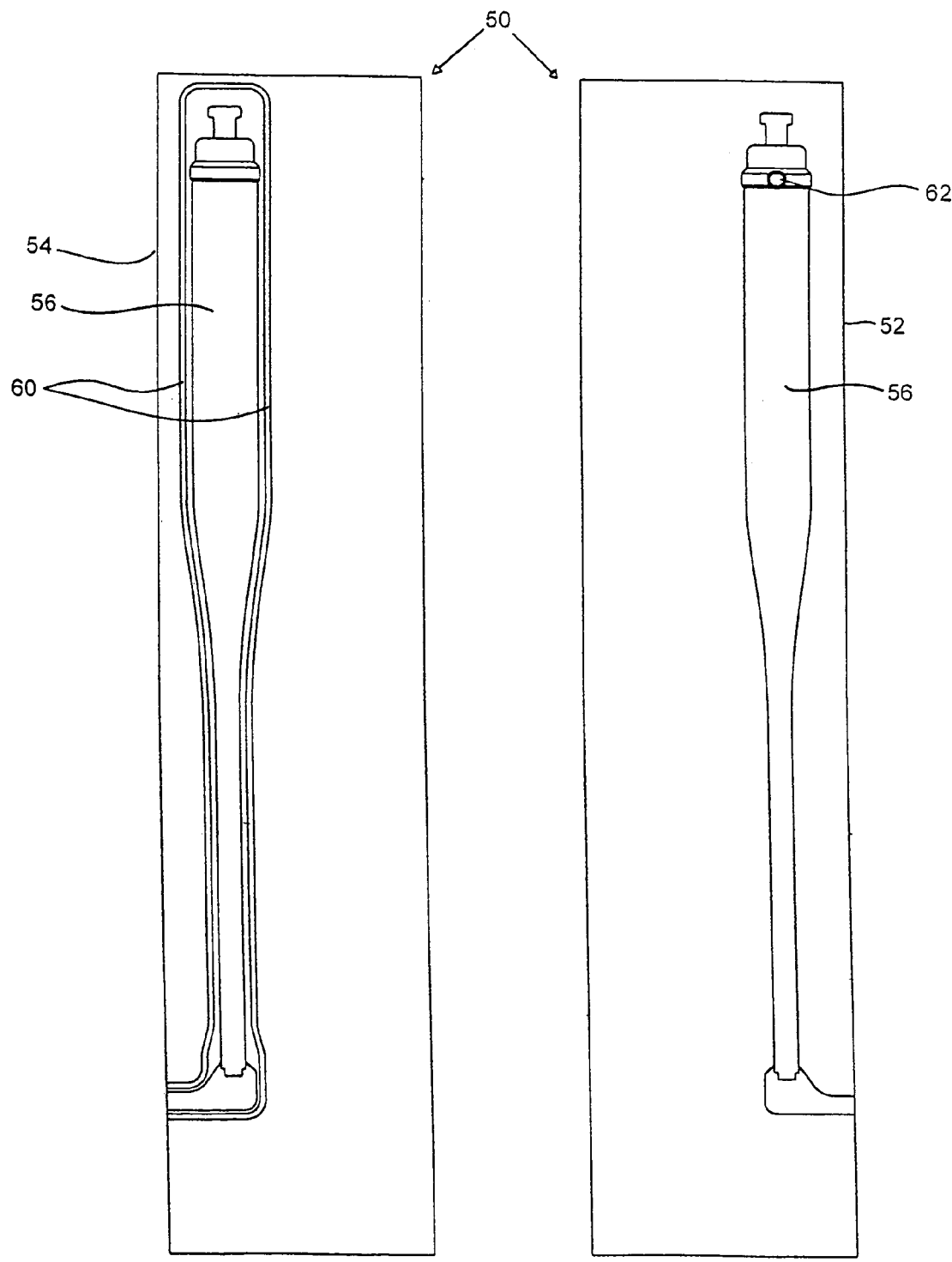
FIG. 9B is a top plan view of a two-piece precision external mold used in the applicant's precision molding process.

Preferably, the applicant's polymer composite bats and bat components are constructed or manufactured using a precision molding process (See FIGS. 8, 9A, and 9B). The precision tooling employed by the applicant in the preferred precision molding process consists of a solid internal mandrel 40 (shaped in a positive form of the desired bat) having a barrel portion 42 and handle portion 44 and external diameters corresponding to the internal tubular diameters of the desired bat, and a solid two-piece precision external mold 50, consisting of a top mold portion 52 and a bottom mold portion 54, and mold cavities 56, all precision machined of a hardened tool steel (for example, P-20 steel). When fitted together, top mold portion 52 and bottom mold portion 54 conform to the precise outside diameters of the desired bat. A rubber "O" ring 60 circles mold cavity 56 to provide a means of sealing the mold 50 when the two mold portions 52, 54 are fitted together and placed into a hydraulic press (not shown). Machining of the mandrel 40 and the mold 50 is preferably accomplished by computer numerically controlled (CNC) machine tools capable of holding precise tolerances. Further finishing of the precision tooling 40, 50 by grinding and polishing results in final tool tolerances of ±0.0001 inches.

Referring to FIG. 8, the precision molding process used by the applicant in manufacturing the polymer composite bats described herein consists of arranging fiber preforms, such as the tubular braid forms 14 shown in FIG. 7C, in multiple layers 15 (see FIG. 7B) over the precision internal mandrel 40 (step 100). Some of the fiber preform layers 15 are arranged to cover the full length of the mandrel 40, while others cover only a portion of the full length, for example, only the barrel portion 42 or only the handle portion 44. The sequence of preform layers 15, whether covering the full length or partial length of the mandrel 40, is determined by the desired physical characteristics of the finished bat. The precision mandrel 40 is then placed within the cavity 56 of bottom portion 54 of the two-piece precision external mold 50 (step 102), and the top portion 52 is fitted in place and inserted into a hydraulic press to seal the cavity (step 104). The mold 50 is heated, preferably using electric platens (step 106), and a two-part thermoset liquid resin is simultaneously mixed and injected into the mold cavity 56, through a conduit 62 using a pump preferably at 25 to 45 psi air pressure, thereby combining the thermoset resin with the reinforcement fibers of the fiber preforms in a resin-fiber matrix (step 108). The mold 50 is continually heated to a thermoset resin curing temperature of between 190° F. and 300° F. Once the thermoset resin has cured or hardened (approximately 3 minutes) (step 110), the mold 50 is opened, and the mandrel 40, including the hardened polymer composite material on its exterior surface, is removed (step 112). The mandrel 40 is subsequently extracted from the polymer composite material using a pneumatic extractor (step 114) and the ends are trimmed to a final desired length (step 116).

Polymer composite bats made using the above-described precision molding process require no additional finishing operations, such as sanding and/or machining, as required in other polymer composite manufacturing processes, such as filament winding, hand lay-up and tube rolling. None of these other processes employ external mold 50, comprising precision top and bottom mold portions 52 and 54 and cavities 56, as described above by the applicant, and thereby result in polymer composite bats that are relatively imprecise with respect to outside diameter, wall thickness, and weight. The bladder molding process, which does not use an internal mandrel, results in similar imprecise dimensions. Subsequent sanding and/or machining steps, while improving achievable tolerances in these other processes, are unable to produce bats having tolerances that match those of the applicant's polymer composite bats made using the above-described precision molding process. Typically, tolerances achieved by the applicant's precision molding process are three times greater than those achievable with other polymer composite manufacturing processes.

In addition, bats made using other polymer composite manufacturing processes, such as filament winding, result in bats that have only continuous fibers extending from the bat handle end all the way through to the bat barrel end. Moreover, these continuous fibers are all placed at resultant fiber angles 22 that are constant within a particular layer 15, thus limiting optimal bat performance. Such other polymer composite manufacturing processes compare unfavourably to the applicant's precision molding process, as described herein, which uses intertwined tubular braid forms 14, which when extended over the full length 8 of the bat 13, produce different resultant fiber angles 22 in the barrel portion 2 compared to the handle portion 4, thus improving bat performance. Also, when smaller diameter tubular braid forms 14 and stitched tubular fibers aligned at 0° to the longitudinal axis 30 are placed only in the handle portion 2, handle axial stiffness is increased and bat performance is further improved.

Tolerances achievable on a consistent basis by the precision molding process described herein by the applicant include: ±0.001 inches for the outside barrel diameter 23 and outside handle diameter 24; ±0.001 inches for the barrel portion 2 wall thickness 10; ±0.003 inches for the barrel portion 2 roundness (also referred to as out-of-roundness); and ±1/16 ounces for the finished bat weight. The precise tolerances achievable by the applicant's precision molding process as described herein, compare favourably to aluminum bats, where tolerances are determined largely by the raw aluminum tubes used in their manufacture. For example, raw aluminum tube specifications are typically in the range of ±0.006 inches (drawn) or ±0.015 inches (extruded), which directly translates to the wall thickness of the finished aluminum bat barrel. Both barrel diameter and barrel wall thickness are subsequently unchanged in the typical swaging process used to produce most aluminum bats. Also, the swaging process typically has a stated barrel roundness tolerance of ±0.005 inches, with many aluminum bats having greater roundness tolerances. Further, aluminum bats, because of their greater inherent dimensional tolerances, have a weight tolerance of ±0.5 ounces.

The importance of achieving low and consistently precise physical dimension tolerances is fundamental to achieving optimal bat performance. For example, a larger outside barrel diameter 23 improves bat performance by increasing the trampoline effect. Also, a larger outside barrel diameter 23 increases the hitting surface area and thus increases the probability of contacting the ball. The outside barrel diameter 23 of bats used in competition is regulated to an allowed maximum barrel diameter. This maximum limit must be taken into account so that manufacturing tolerances do not result in bats that exceed the regulated maximums. Because of the exceptionally low tolerances achieved by the applicant's precision molding process, as described herein, bats produced using this process have outside barrel diameters 23 that are capable of being consistently much closer to the regulated allowable maximum diameters than bats produced using any other manufacturing process. Also, reducing barrel wall thickness 10 is directly related to lower transverse or radial compression stiffness in barrel portion 2 and thus to increased trampoline effect and increased bat performance. However, decreasing barrel wall thickness 10 to improve performance is offset by a decrease in durability. Precise control of barrel wall thickness 10, as achieved by bats manufactured using the applicant's precision molding process as described herein, allows for optimally thinner barrel wall thickness 10 for a given acceptable durability. Further, the low and consistently precise dimensional tolerances of the applicant's precision molding process, result in much tighter weight tolerances, which allow consistent and accurate bat moments of inertia, resulting in consistent feel and swing weight, highly favoured by players using bats in all bat categories.

The applicant's polymer composite bats as described herein may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

We claim:

1. A baseball bat comprising:

a handle portion for gripping, said handle portion having a handle length;

a cylindrical tubular hollow void barrel portion for striking, said barrel portion having a barrel length; and a tapered mid-section portion connecting said handle portion and said barrel portion;

said handle, barrel and mid-section portions constructed solely of a polymer composite material, said polymer composite material comprising a thermoset resin and continuous length reinforcement fibers, wherein said continuous length reinforcement fibers in said handle portion have a handle fiber length and said continuous length reinforcement fibers in said barrel portion have a barrel fiber length, and wherein said handle fiber length is greater than said handle length and said barrel fiber length is greater than said barrel length, said continuous length reinforcement fibers being arranged at a resultant fiber angle relative to a central longitudinal axis of the bat, wherein an average of the absolute values of all said resultant fiber angles in said handle portion is less than an average of the absolute values of all said resultant fiber angles in said barrel portion, thereby providing said handle portion with an axial stiffness that is greater than the axial stiffness of said barrel portion, and wherein the axial stiffness of the handle portion is between 50,000 lb-in$^2$ and 250,000 lb-in$^2$, and the radial compression stiffness of said barrel portion is between 70 lb/in and 350 lb/in.

2. The baseball bat of claim 1, wherein said average of the absolute values of all of said resultant fiber angles in said handle portion is between 5° and 30° less than said average of the absolute values of all of said resultant fiber angles in said barrel portion.

3. The baseball bat of claim 1, wherein said average of the absolute values of all of said resultant fiber angles in said handle portion is less than 20° and said average of the absolute values of all of said resultant fiber angles in said barrel portion is greater than 25°.

4. A baseball bat comprising:
a handle portion for gripping, said handle portion having a handle length;
a cylindrical tubular hollow void barrel portion for striking, said barrel portion having a barrel length; and
a tapered mid-section portion connecting said handle portion and said barrel portion;
said handle, barrel and mid-section portions constructed solely of a polymer composite material,
said polymer composite material comprising a thermoset resin and continuous length reinforcement fibers,
wherein said continuous length reinforcement fibers in said handle portion have a handle fiber length and said continuous length reinforcement fibers in said barrel portion have a barrel fiber length, and wherein said handle fiber length is greater than said handle length and said barrel fiber length is greater than said barrel length,
said continuous length reinforcement fibers being arranged at a resultant fiber angle relative to a central longitudinal axis of the bat, wherein an average of the absolute values of all said resultant fiber angles in said handle portion is less than an average of the absolute values of all said resultant fiber angles in said barrel portion, thereby providing said handle portion with an axial stiffness that is greater than the axial stiffness of said barrel portion, and
wherein the first bending mode frequency of the handle portion is between 100 and 600 hertz, and the hoop frequency of said barrel portion is between 800 and 2000 hertz.

5. The baseball bat of claim 4, wherein said average of the absolute values of all of said resultant fiber angles in said handle portion is between 5° and 30° less than said average of the absolute values of all of said resultant fiber angles in said barrel portion.

6. The baseball bat of claim 4, wherein said average of the absolute values of all of said resultant fiber angles in said handle portion is less than 20° and said average of the absolute values of all of said resultant fiber angles in said barrel portion is greater than 25°.

* * * * *